US012056887B2

(12) United States Patent
Ding et al.

(10) Patent No.: US 12,056,887 B2
(45) Date of Patent: Aug. 6, 2024

(54) METHODS AND SYSTEMS FOR UNSUPERVISED DEPTH ESTIMATION FOR FISHEYE CAMERAS USING SPATIAL-TEMPORAL CONSISTENCY

(71) Applicant: Volvo Car Corporation, Gothenburg (SE)

(72) Inventors: Sihao Ding, Sunnyvale, CA (US); Jianhe Yuan, Irving, TX (US)

(73) Assignee: Volvo Car Corporation, Gothenburg (SE)

( * ) Notice: Subject to any disclaimer, the term of this patent is extended or adjusted under 35 U.S.C. 154(b) by 257 days.

(21) Appl. No.: 17/684,580

(22) Filed: Mar. 2, 2022

(65) Prior Publication Data
US 2023/0281852 A1 Sep. 7, 2023

(51) Int. Cl.
*G06T 7/593* (2017.01)
*G06V 10/774* (2022.01)
*G06V 20/56* (2022.01)
*B60W 60/00* (2020.01)

(52) U.S. Cl.
CPC ............ *G06T 7/593* (2017.01); *G06V 10/774* (2022.01); *G06V 20/56* (2022.01); *B60W 60/001* (2020.02); *B60W 2420/403* (2013.01); *G06T 2207/10021* (2013.01); *G06T 2207/10028* (2013.01); *G06T 2207/20081* (2013.01); *G06T 2207/20228* (2013.01); *G06T 2207/30252* (2013.01)

(58) Field of Classification Search
CPC ........... G06T 7/593; G06T 2207/10021; G06T 2207/10028; G06T 2207/20081; G06T 2207/20228; G06T 2207/30252; G06T 5/80; G06T 2207/20084; G06T 2207/30244; G06T 7/579; G06V 10/774; G06V 20/56; G06V 20/58; B60W 60/001; B60W 2420/403
See application file for complete search history.

(56) References Cited

U.S. PATENT DOCUMENTS

2022/0301206 A1* 9/2022 Guizilini .................. G06T 3/40

* cited by examiner

*Primary Examiner* — Yuen Wong
(74) *Attorney, Agent, or Firm* — Clements Bernard Walker; Christopher L. Bernard; Devin Cummins

(57) ABSTRACT

Methods and systems for unsupervised depth estimation for fisheye cameras using spatial-temporal (and, optionally, modal) consistency. This unsupervised depth estimation works directly on raw, distorted stereo fisheye images, such as those obtained from the four fisheye camera disposed around a vehicle in rigid alignment. Temporal consistency involves training a depth estimation model using a sequence of frames as input, while spatial consistency involves training the depth estimation model using overlapping images from synchronized stereo camera pairs. Images from different stereo camera pairs can also be used at different times. Modal consistency, when applied, dictates that different sensor types (e.g., camera, lidar, etc.) must also agree. The methods and systems of the present disclosure utilize a fisheye camera projection model that projects a disparity map into a point cloud map, which aides in the rectification of stereo pairs.

17 Claims, 7 Drawing Sheets

METHODS AND SYSTEMS FOR UNSUPERVISED DEPTH ESTIMATION FOR FISHEYE CAMERAS USING SPATIAL-TEMPORAL CONSISTENCY

TECHNICAL FIELD

The present disclosure relates generally to the automotive and autonomous driving fields. More particularly, the present disclosure relates to methods and systems for unsupervised depth estimation for fisheye cameras using spatial-temporal consistency.

BACKGROUND

Depth estimation is used in autonomous driving to provide depth information related to objects in the environment surround a vehicle. It is usually achieved via a deep learning algorithm applied to images obtained from lidar, a monocular camera, or stereo camera pairs. This deep learning algorithm can be supervised or unsupervised. Some vehicles are equipped with fisheye cameras (e.g., four fisheye cameras) that have a relatively large field of view (FOV), making them especially useful in autonomous driving. Depth estimation for images obtained from a stereo fisheye camera would seem to be solvable using conventional computer vision algorithms and machine learning algorithms, however, unsupervised depth estimation for images obtained from a stereo fisheye camera presents unique challenges. Complexity is introduced by the relatively large FOV, the relatively large rotation and translation between adjacent fisheye cameras, and the peculiarities of unsupervised training methods. In general, depth estimation around a vehicle usually considers pixel intensities and is supervised, taking advantage of ground truth labels. Unsupervised training methods require constraints (e.g., similar colors represent similar depths, etc.). It is these challenges that are addressed by the methods and systems of the present disclosure.

This background is provided as an illustrative contextual environment only. It will be readily apparent to those of ordinary skill in the art that the methods and systems of the present disclosure may be implemented in other contextual environments equally.

SUMMARY

The present disclosure provides methods and systems for unsupervised depth estimation for fisheye cameras using spatial-temporal (and, optionally, modal) consistency. This unsupervised depth estimation works directly on raw, distorted stereo fisheye images, such as those obtained from the four fisheye camera disposed around a vehicle in rigid alignment. Temporal consistency involves training a depth estimation model using a sequence of frames as input, while spatial consistency involves training the depth estimation model using overlapping images from synchronized stereo camera pairs. Images from different stereo camera pairs can also be used at different times. Modal consistency, when applied, dictates that different sensor types (e.g., camera, lidar, etc.) must also agree. The methods and systems of the present disclosure utilize a fisheye camera projection model that projects a disparity map into a point cloud map, which aides in the rectification of stereo pairs.

In one illustrative embodiment, the present disclosure provides a depth estimation system for a vehicle, including: memory storing instructions executed by a processor to pretrain a depth estimation network using a plurality of temporally-separated image frames while applying a temporal consistency constraint, thereby providing a pretrained depth estimation network; and memory storing instructions executed by the processor to train the pretrained depth estimation network using a plurality of spatially-separated image frames while applying a spatial consistency constraint, thereby providing a trained depth estimation network. The plurality of temporally-separated image frames include a plurality of temporally-separated fisheye camera image frames and the plurality of spatially-separated image frames include a plurality of spatially-separated fisheye camera image frames. The depth estimation system further includes: a fisheye camera coupled to the vehicle; and memory storing instructions executed by the processor to receive a fisheye camera image from the fisheye camera coupled to the vehicle and, using the trained depth estimation network, estimate a distance from the fisheye camera to an object present in the fisheye camera image. The depth estimation system further includes memory storing instructions executed by the processor to control the operation of a vehicle system based on the estimated distance from the fisheye camera to the object present in the fisheye camera image. The depth estimation method is pretrained and trained in an unsupervised manner. Optionally, the depth estimation system further includes memory storing instructions executed by the processor to further train the pretrained or trained depth estimation network using a plurality of modally-different image frames while applying a modal consistency constraint, thereby providing a further trained depth estimation network. Optionally, the depth estimation system further includes: a fisheye camera coupled to the vehicle; and memory storing instructions executed by the processor to receive a fisheye camera image from the fisheye camera coupled to the vehicle and, using the further trained depth estimation network, estimate a distance from the fisheye camera to an object present in the fisheye camera image. The pretraining and training utilize a fisheye camera projection model that projects a disparity map into a point cloud map, thereby aiding in the rectification of fisheye camera stereo pairs.

In another illustrative embodiment, the present disclosure provides a depth estimation method for a vehicle, including: pretraining a depth estimation network using a plurality of temporally-separated image frames while applying a temporal consistency constraint, thereby providing a pretrained depth estimation network; and training the pretrained depth estimation network using a plurality of spatially-separated image frames while applying a spatial consistency constraint, thereby providing a trained depth estimation network. The plurality of temporally-separated image frames include a plurality of temporally-separated fisheye camera image frames and the plurality of spatially-separated image frames include a plurality of spatially-separated fisheye camera image frames. The depth estimation method further includes receiving a fisheye camera image from a fisheye camera coupled to the vehicle and, using the trained depth estimation network, estimating a distance from the fisheye camera to an object present in the fisheye camera image. The depth estimation further includes controlling the operation of a vehicle system based on the estimated distance from the fisheye camera to the object present in the fisheye camera image. The depth estimation method is pretrained and trained in an unsupervised manner. Optionally, the depth estimation method further includes further training the pretrained or trained depth estimation network using a plurality of modally-different image frames while applying a modal consistency constraint, thereby providing a further trained depth estimation network. Optionally, the depth estimation method further includes receiving a fisheye camera image from a fisheye camera coupled to the vehicle and, using the further trained depth estimation network, estimating a distance from the fisheye camera to an object present in the fisheye camera image. The pretraining and training utilize a fisheye camera projection model that projects a disparity map into a point cloud map, thereby aiding in the rectification of fisheye camera stereo pairs.

In a further illustrative embodiment, the present disclosure provides a non-transitory computer-readable medium including instructions stored in a memory and executed by a processor to carry out the depth estimation steps including: pretraining a depth estimation network using a plurality of temporally-separated image frames while applying a temporal consistency constraint, thereby providing a pretrained depth estimation network; and training the pretrained depth estimation network using a plurality of spatially-separated image frames while applying a spatial consistency constraint, thereby providing a trained depth estimation network. The plurality of temporally-separated image frames include a plurality of temporally-separated fisheye camera image frames and the plurality of spatially-separated image frames include a plurality of spatially-separated fisheye camera image frames. The steps further include: receiving a fisheye camera image from a fisheye camera coupled to a vehicle and, using the trained depth estimation network, estimating a distance from the fisheye camera to an object present in the fisheye camera image; and controlling the operation of a vehicle system based on the estimated distance from the fisheye camera to the object present in the fisheye camera image. The depth estimation method is pretrained and trained in an unsupervised manner. Optionally, the steps further include further training the pretrained or trained depth estimation network using a plurality of modally-different image frames while applying a modal consistency constraint, thereby providing a further trained depth estimation network. Optionally, the steps further include receiving a fisheye camera image from a fisheye camera coupled to the vehicle and, using the further trained depth estimation network, estimating a distance from the fisheye camera to an object present in the fisheye camera image. The pretraining and training utilize a fisheye camera projection model that projects a disparity map into a point cloud map, thereby aiding in the rectification of fisheye camera stereo pairs.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF ILLUSTRATIVE EMBODIMENTS

Again, the present disclosure provides methods and systems for unsupervised depth estimation for fisheye cameras using spatial-temporal (and, optionally, modal) consistency. This unsupervised depth estimation works directly on raw, distorted stereo fisheye images, such as those obtained from the four fisheye camera disposed around a vehicle in rigid alignment. Temporal consistency involves training a depth estimation model using a sequence of frames as input, while spatial consistency involves training the depth estimation model using overlapping images from synchronized stereo camera pairs. Images from different stereo camera pairs can also be used at different times. Modal consistency, when applied, dictates that different sensor types (e.g., camera, lidar, etc.) must also agree. The methods and systems of the present disclosure utilize a fisheye camera projection model that projects a disparity map into a point cloud map, which aides in the rectification of stereo pairs.

Figure 1:
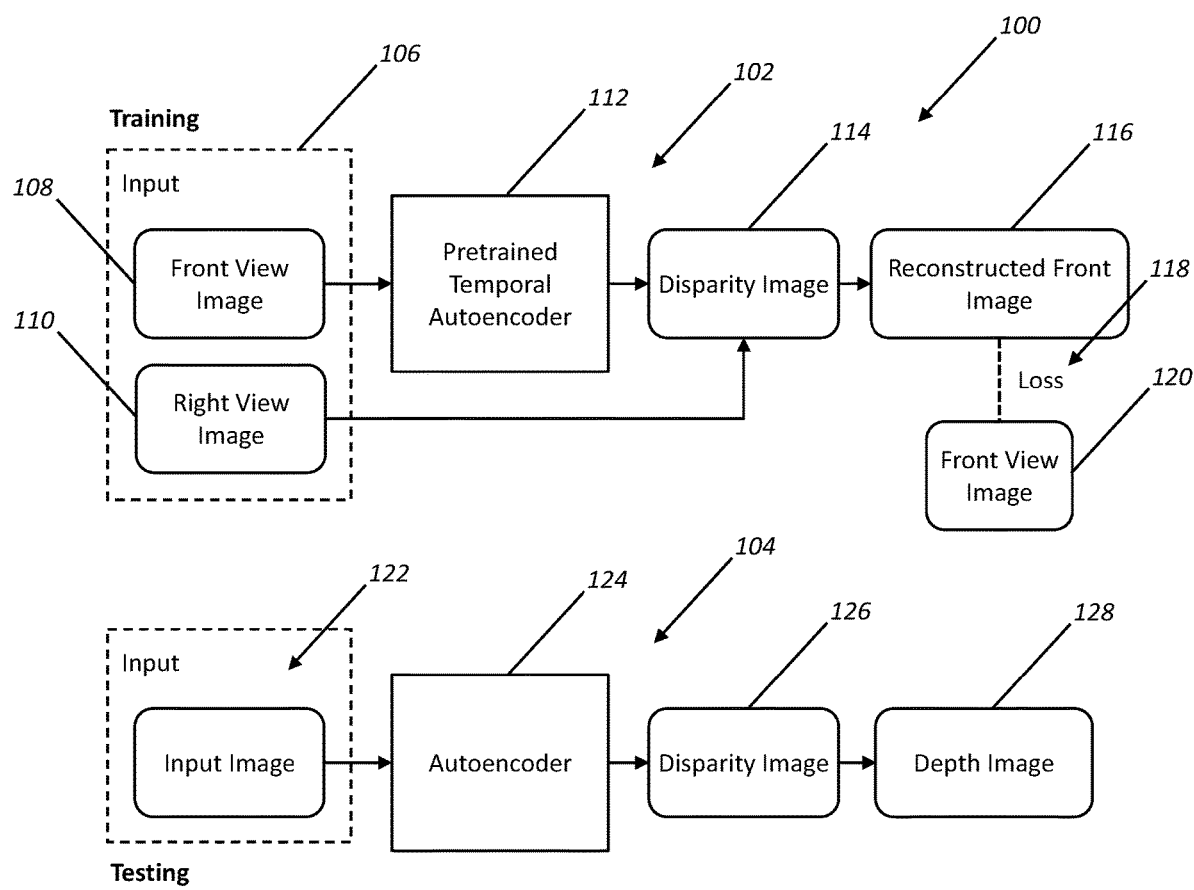
FIG. 1 is a schematic diagram illustrating one embodiment of the unsupervised fisheye camera spatial-temporal consistency depth estimation system and method of the present disclosure.

Referring now specifically to FIG. 1, in one illustrative embodiment, the unsupervised fisheye camera spatial-temporal consistency depth estimation system and method 100 of the present disclosure includes a training routine 102 and a testing routine 104. In the training routine 102, the input 106 includes a first view image 108, such as a front view image from a fisheye camera or the like, and a second view image 110, such as a right view image from the fisheye camera or the like. It will be readily apparent to those of ordinary skill in the art that other overlapping view images could be used as well. The first view image 108 is provided to a pretrained temporal autoencoder 112 that applies the appropriate temporal consistency considerations and provides a disparity image 114. The second view image 110 is provided to the disparity image 114, applying the appropriate spatial consistency considerations, providing a reconstructed front image 116. In view of losses 118, a first view image 120, such as a front view image, is provided for training. Again, it will be readily apparent to those of ordinary skill in the art that another training image could be provided as well. In the testing routine 104, the input image 122 is provided to the resulting autoencoder 124, trained using the training image 120, to provide a disparity image 126 and, ultimately a depth image 128, as described in greater detail herein.

Thus, the autoencoder 124 is trained to provide depth estimation for a fisheye camera image using training images 120 for which temporal and spatial (and, optionally, modal) consistency have been applied. Again, this unsupervised depth estimation works directly on raw, distorted stereo fisheye images, such as those obtained from the four fisheye camera disposed around a vehicle in rigid alignment. Temporal consistency involves training the depth estimation model using a sequence of frames as input, while spatial consistency involves training the depth estimation model using overlapping images from synchronized stereo camera pairs. Images from different stereo camera pairs can also be used at different times. Modal consistency, when applied, dictates that different sensor types (e.g., camera, lidar, etc.) must also agree.

Figure 2:
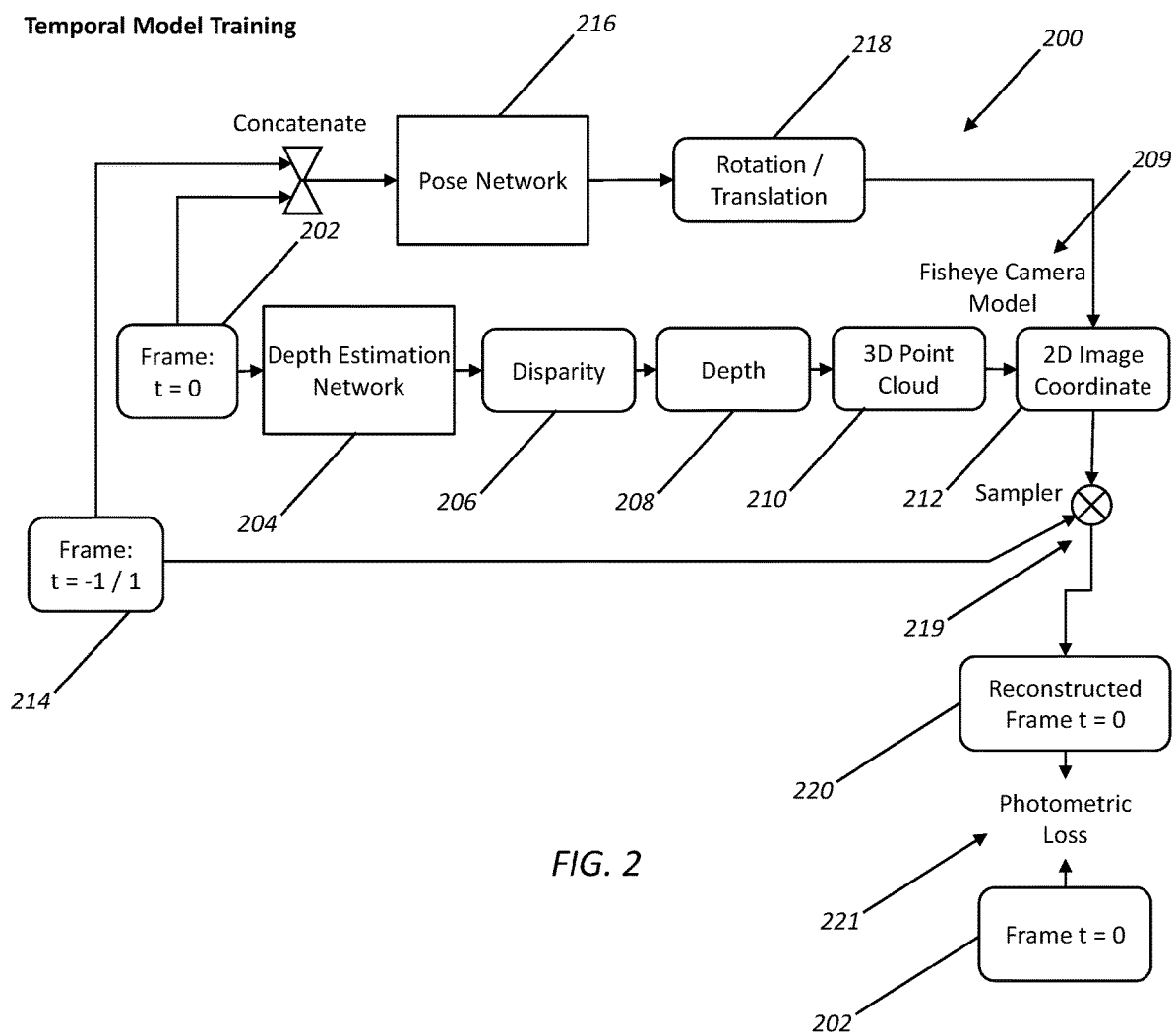
FIG. 2 is a schematic diagram illustrating one embodiment of the temporal model training system and method of the present disclosure.

Referring now specifically to FIG. 2, in one illustrative embodiment, the temporal model training system and method 200 of the present disclosure includes providing a frame t=0 202 to a depth estimation network 204 to provide disparity information 206 and depth information 208, and a fisheye camera model 209 including a 3D point cloud 210 and 2D image coordinate information 212. A frame t=−1/1 214 is concatenated with frame t=0 and provided to a pose network 216 to provide rotation/translation information 218 that is applied to the 2D image coordinate information 212. A sampler 219 collects the information from the frame t=0 202 and the frame t=−1/1 214 and provides reconstructed frame t=0, which differs from frame t=0 202 by the photometric loss 221. Here the frames are all images or sequences of video at different time stamps, which may or may not be sequential. The system and method 200 first train the depth estimation model using a monocular video and this information is saved for initialization of the spatial model, as described in greater detail herein.

Figure 3:
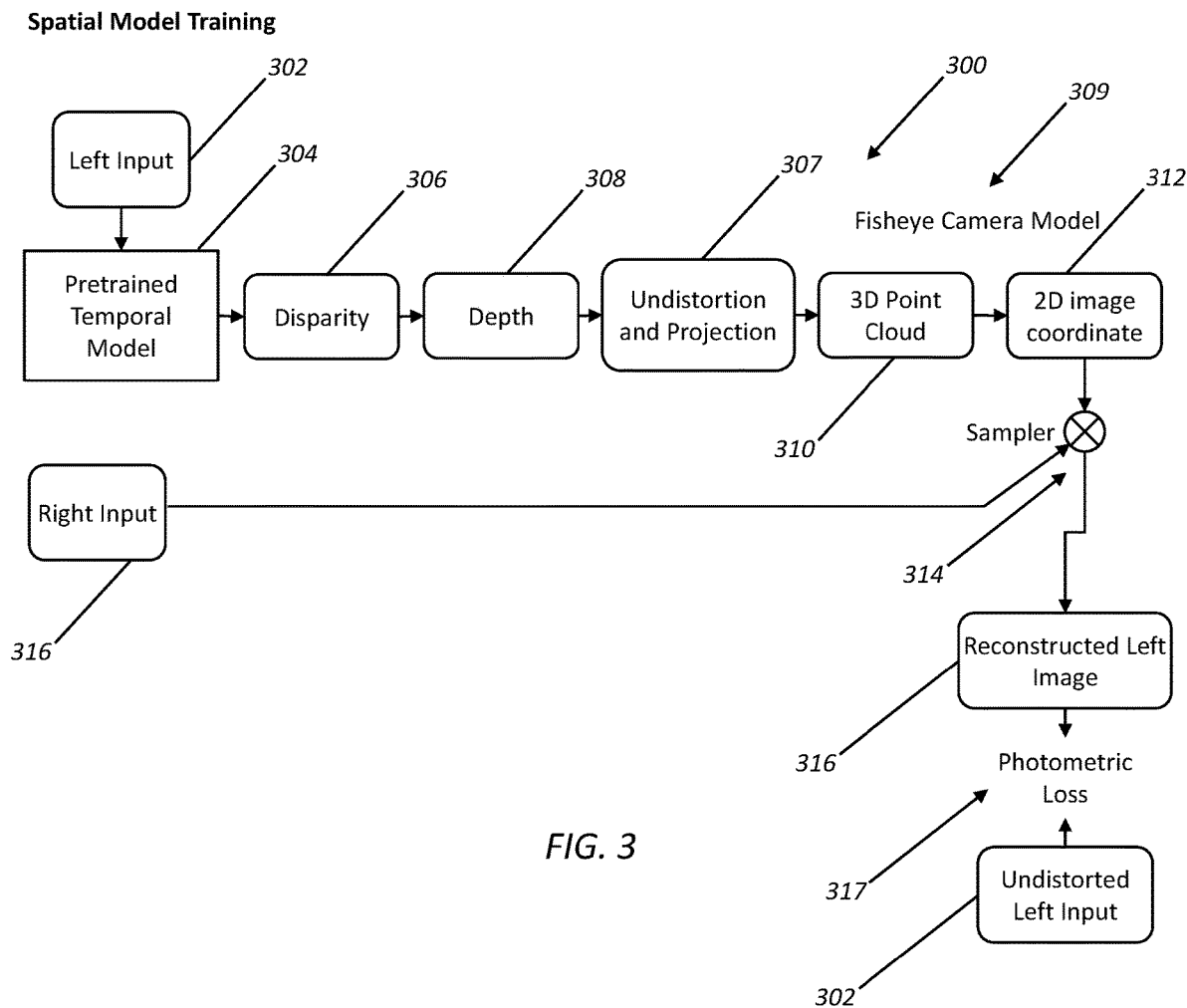
FIG. 3 is a schematic diagram illustrating one embodiment of the spatial model training system and method of the present disclosure.

The depth estimation model is then initialized with the previously pretrained temporal model. Referring now specifically to FIG. 3, in one illustrative embodiment, the spatial model training system and method 300 of the present disclosure includes providing a left input 302, for example, to the pretrained temporal model 304 to provide disparity information 306 and depth information 308 for undistortion and projection 307, and a fisheye camera model 309 including a 3D point cloud 310 and 2D image coordinate information 312. A sampler 314 collects the information from the left input and a right input 316, for example, and provides reconstructed left image 316, which differs from undistorted left input 302 by the photometric loss 317.

In this manner, unsupervised depth estimation for fisheye cameras is provided using spatial-temporal (and, optionally, modal) consistency, working directly on raw, distorted stereo fisheye images, such as those obtained from the four fisheye camera disposed around a vehicle in rigid alignment. The temporal consistency is provided by training the depth estimation model using the sequence of frames as input, while the spatial consistency is provided by subsequently training the depth estimation model using the overlapping images from the synchronized stereo camera pairs. As mentioned above, images from different stereo camera pairs can also be used at different times. Modal consistency, when applied, dictates that different sensor types (e.g., camera, lidar, etc.) must also agree.

Figure 4:
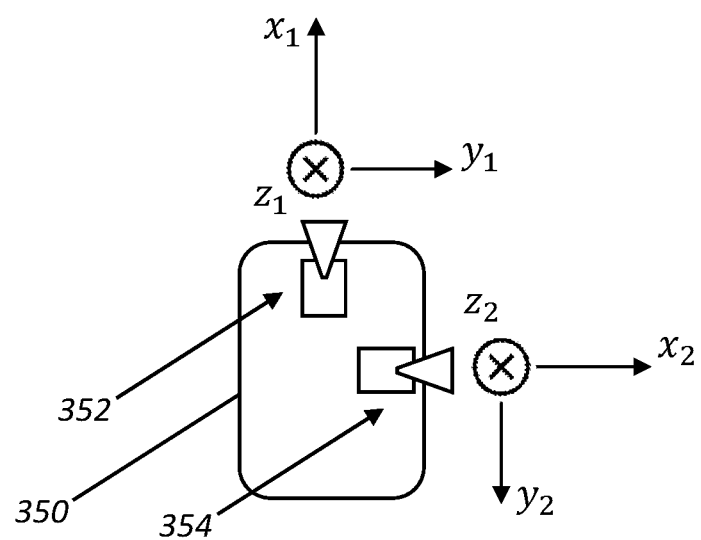
FIG. 4 is a schematic diagram illustrating the fisheye cameras disposed around a vehicle and utilized in conjunction with the systems and methods of the present disclosure.

The unprojection from the image coordinates to the camera coordinates (i.e., depth to 3D point cloud) utilizes the following steps:
Suppose an image pixel $p=(u, v)^T$ and its depth estimation D
Letting $$(x_i, y_i)^T = \left(\frac{u - c_x}{a_x}, \frac{v - c_y}{a_y}\right),$$

where $C_x$, $C_y$ are principal points, $a_x$, $a_y$ are aspect ratios $\rho(\theta)=\sqrt{x_i^2+y_i^2}=k_1\theta+k_2\theta^2+k_3\theta^3+k_4\theta^4$ For training efficiency, the roots are pre-calculated and stored in a lookup table for all values θ
$r_c=D\cdot\sin(\theta)$ and $z_c=D\cdot\cos(\theta)$ The polar angle $\varphi=\arctan 2(y_i, x_i)$
$x_c=r_c\cdot\cos(\varphi)$ and $y_c=r_c\cdot\sin(\varphi)$ The projection from the camera coordinates to the image coordinates (i.e., 3D point cloud to 2D image) utilizes the following steps:
Suppose a 3D point $X_c=(x_c, y_c, z_c)^T$
$\varphi=\arctan 2(y_c, x_c)$ $r_c=\sqrt{x_c^2+y_c^2}$ The angle of incidence $\theta=-\arctan 2(z_c, r_c)$
$\rho(\theta)=k_1\theta+k_2\theta^2+k_3\theta^3+k_4\theta^4$, where $k_1$, $k_2$, $k_3$ and $k_4$ are distortion coefficients
Image coordinate $p=(u,v)^T=(\rho(\theta)\cdot\cos(\varphi)\cdot a_x+C_x, \rho(\theta)\cdot\sin(\varphi)\cdot a_y+c_y)^T$ Referring now specifically to FIG. 4, depth estimation from a pair of distorted and unrectified raw fisheye images from a pair of fisheye cameras 352, 354 coupled to a vehicle 350 (of four synchronized fisheye cameras positioned at the four side of the vehicle 350, for example) presents the problem addressed by the present disclosure. Due to the relatively large rotation of the two fisheye cameras 352, 354, the depth estimation model has difficulty reconstructing the depth image using a disparity methodology. Thus, the photometric loss cannot be converged well, making the depth estimation problem more difficult to solve. To address this problem, the present disclosure initializes the depth estimation model with the pretrained temporal model. The depth estimation model is first trained with a monocular video (frame t=−1/0/1), which provides temporal consistency loss. Then, the depth estimation model is initialized with this pretrained temporal model, which enables the generation of a basic depth estimation from the input. In this manner, it is relatively easier to minimize error associated with the spatial model in the reconstruction of the front image, for example, after sampling from the right image, for example.

In terms of unsupervised learning using photometric loss, the depth estimation model is trained using an unsupervised method. Setting up an accurate ground truth of the entire dataset is expensive and time consuming. In addition, an unsupervised method makes it relatively easier to continually self-learn a better model while data is collected. The unsupervised model is trained by finding the location of objects in the left image and the right image, for example, which means finding a shift in pixels between the two images. This disparity is then used to calculate the depth of an object in the image. The photometric loss is calculated as:

$$L_p(I_l, I_{r\to l}) = \alpha \cdot \frac{1 - SSIM(I_l, I_{r\to l})}{2} + (1-\alpha)\|I_l - I_{r\to l}\|_{l1},$$

where $I_l$ is the left target image, $I_{r\to l}$ is the reconstructed target image, which is calculated using the L1 loss function.

Thus, depth estimation models have been trained using temporal consistency or spatial consistency. Such temporal consistency models can provide basic depth estimations, but, given objects that move at speeds comparable to those of a camera, such temporal consistency models always assume that moving objects are static. This compromises accuracy. Thus, the present disclosure trains the depth estimation model by combining the temporal and spatial training methods, and, optionally, adding modal consistency constraints. This temporal-spatial training can be batch-by-batch or iteration-by-iteration.

In terms of establishing a real-world distance using a depth network, for a pinhole camera model, for example, the sigmoid output from a decoder of the depth estimation model is converted to distance with:

$$D = \frac{1}{a \cdot \sigma + b},$$

where a and b are chosen to constrain the distance between the two parameters. Since the function of disparity-to-depth is not suitable for a fisheye camera, the system and method of the present disclosure use the output of the decoder as the real-world distance directly. Using the real-world distance in the depth network minimizes the error in point cloud projections and leads to improved accuracy.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. It will be readily apparent to those of ordinary skill in the art that the systems and methods of the present disclosure may be implemented by in-vehicle computational devices (i.e., processors and memory) or in the cloud.

Figure 5:
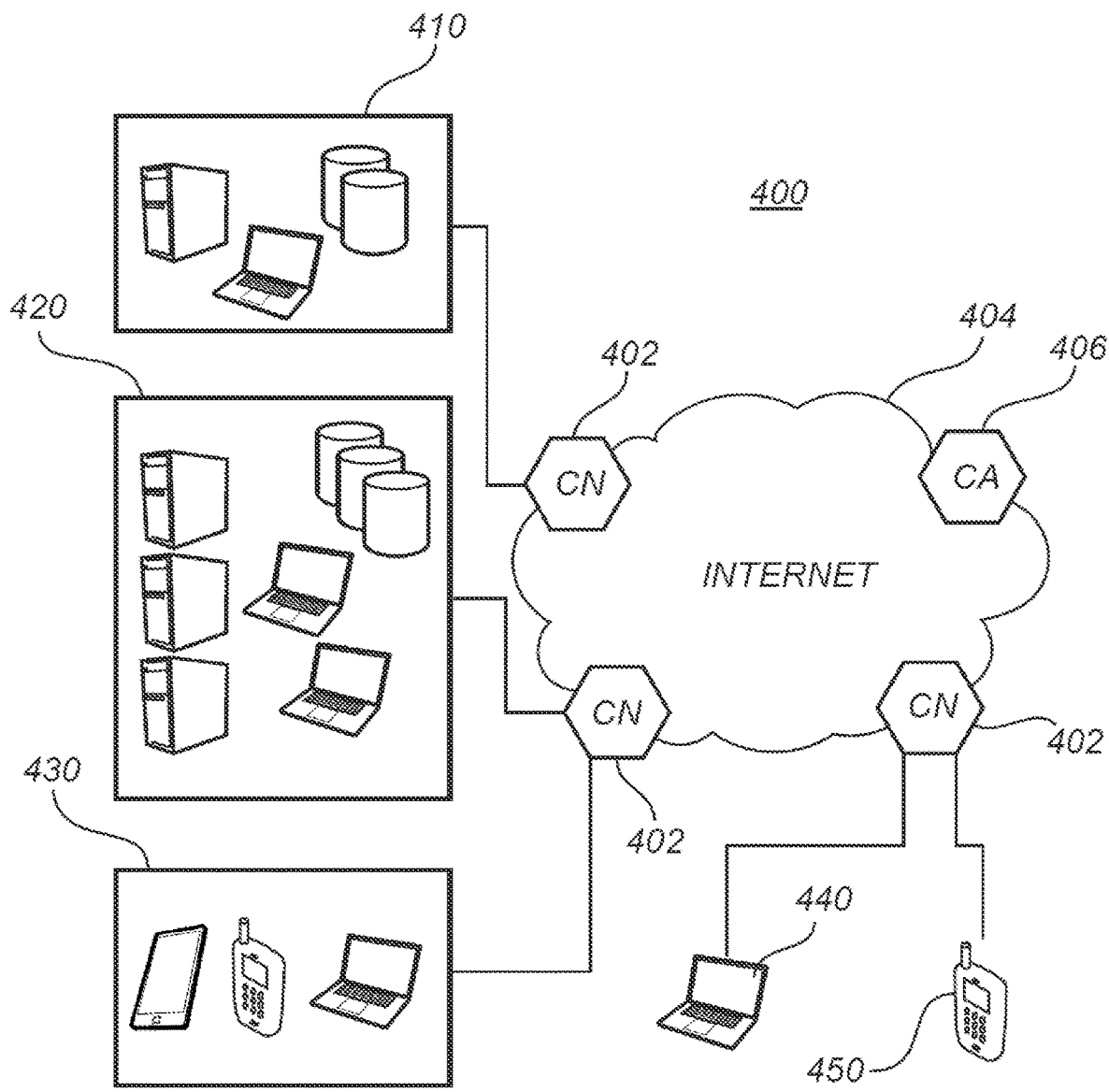
FIG. 5 is a network diagram of a cloud-based computational system for implementing various cloud-based services of the present disclosure, as appropriate.
Figure 6:
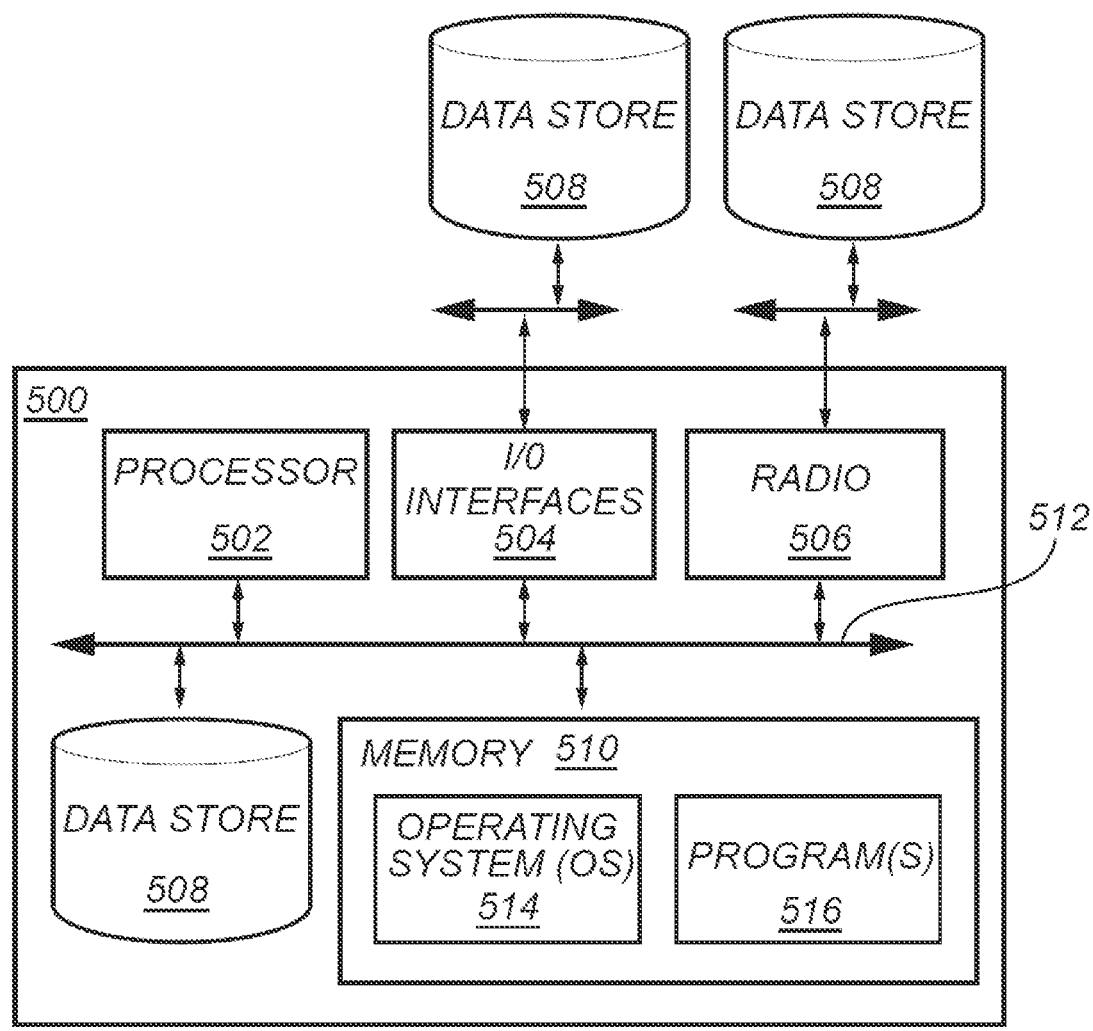
FIG. 6 is a block diagram of a server that may be used in the cloud-based computational system of FIG. 5 or stand-alone, as appropriate.

FIG. 5 is a network diagram of a cloud-based computational system 400 for implementing various cloud-based services of the present disclosure, as appropriate. The cloud-based system 400 includes one or more cloud nodes (CNs) 402 communicatively coupled to the Internet 404 or the like. The cloud nodes 402 may be implemented as a server 500 (as illustrated in FIG. 6) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 6 is a block diagram of a server 500, which may be used in the cloud-based computational system 400 (FIG. 5), in other systems, or stand-alone, as appropriate. For example, the CNs 402 (FIG. 5) and the central authority nodes 406 (FIG. 5) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 6 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 5). The network interface 506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
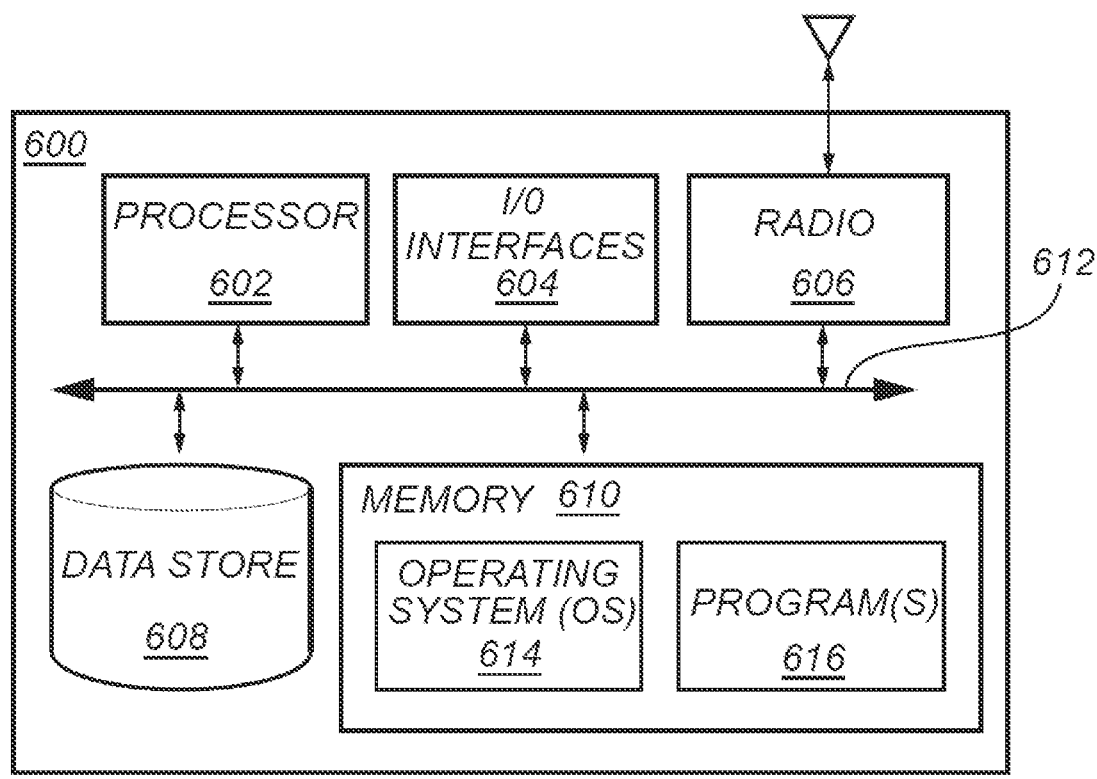
FIG. 7 is a block diagram of a vehicle system or user device that may be used in the cloud-based computational system of FIG. 5 or stand-alone, as appropriate.

FIG. 7 is a block diagram of a vehicle or user device 600, which may be used in the cloud-based computational system 400 (FIG. 5), as part of a network, or stand-alone, as appropriate. Again, the user device 600 can be a vehicle, a smartphone, a tablet, a smartwatch, an Internet of Things (IOT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 7 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 7, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network, such as the cloud-based system 400 (FIG. 5).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A depth estimation system for a vehicle, the depth estimation system comprising:
a fisheye camera coupled to the vehicle;
a processor; and
memory, the memory storing instructions executed by the processor to: pretrain a depth estimation network using a plurality of temporally-separated image frames while applying a temporal consistency constraint, thereby providing a pretrained depth estimation network; and
train the pretrained depth estimation network using a plurality of spatially-separated image frames while applying a spatial consistency constraint, thereby providing a trained depth estimation network;
wherein the plurality of temporally-separated image frames comprise a plurality of temporally-separated fisheye camera image frames and the plurality of spatially-separated image frames comprise a plurality of spatially-separated fisheye camera image frames.

2. The depth estimation system of claim 1, wherein the processor is configured to receive a fisheye camera image from the fisheye camera coupled to the vehicle and, using the trained depth estimation network, estimate a distance from the fisheye camera to an object present in the fisheye camera image.

3. The depth estimation system of claim 2, wherein the processor is configured to control an operation of a vehicle system based on the estimated distance from the fisheye camera to the object present in the fisheye camera image.

4. The depth estimation system of claim 1, wherein the processor is configured to further train the pretrained or trained depth estimation network using a plurality of modally-different image frames while applying a modal consistency constraint, thereby providing a further trained depth estimation network.

5. The depth estimation system of claim 4, wherein the processor is configured to receive a fisheye camera image from the fisheye camera coupled to the vehicle and, using the further trained depth estimation network, estimate a distance from the fisheye camera to an object present in the fisheye camera image.

6. The depth estimation system of claim 1, wherein the pretraining and training utilize a fisheye camera projection model that projects a disparity map into a point cloud map, thereby aiding in a rectification of fisheye camera stereo pairs.

7. A depth estimation method for a vehicle, the depth estimation method comprising:
coupling a fisheye camera to the vehicle;
pretraining a depth estimation network using a plurality of temporally-separated image frames while applying a temporal consistency constraint, thereby providing a pretrained depth estimation network; and
training the pretrained depth estimation network using a plurality of spatially-separated image frames while applying a spatial consistency constraint, thereby providing a trained depth estimation network;
wherein the plurality of temporally-separated image frames comprise a plurality of temporally-separated fisheye camera image frames and the plurality of spatially-separated image frames comprise a plurality of spatially-separated fisheye camera image frames.

8. The depth estimation method of claim 7, further comprising:
receiving a fisheye camera image from the fisheye camera coupled to the vehicle and, using the trained depth estimation network, estimating a distance from the fisheye camera to an object present in the fisheye camera image.

9. The depth estimation method of claim 8, further comprising:
controlling an operation of a vehicle system based on the estimated distance from the fisheye camera to the object present in the fisheye camera image.

10. The depth estimation method of claim 7, further comprising:
further training the pretrained or trained depth estimation network using a plurality of modally-different image frames while applying a modal consistency constraint, thereby providing a further trained depth estimation network.

11. The depth estimation method of claim 10, further comprising:
receiving a fisheye camera image from the fisheye camera coupled to the vehicle and, using the further trained depth estimation network, estimating a distance from the fisheye camera to an object present in the fisheye camera image.

12. The depth estimation method of claim 7, wherein the pretraining and training utilize a fisheye camera projection model that projects a disparity map into a point cloud map, thereby aiding in a rectification of fisheye camera stereo pairs.

13. A non-transitory computer-readable medium comprising instructions stored in a memory and executed by a processor to carry out depth estimation steps, the depth estimation steps comprising:
coupling a fisheye camera to a vehicle;
pretraining a depth estimation network using a plurality of temporally-separated image frames while applying a temporal consistency constraint, thereby providing a pretrained depth estimation network; and
training the pretrained depth estimation network using a plurality of spatially-separated image frames while applying a spatial consistency constraint, thereby providing a trained depth estimation network;
wherein the plurality of temporally-separated image frames comprise a plurality of temporally-separated fisheye camera image frames and the plurality of spatially-separated image frames comprise a plurality of spatially-separated fisheye camera image frames.

14. The non-transitory computer-readable medium of claim 13, the steps further comprising:
receiving a fisheye camera image from the fisheye camera coupled to the vehicle and, using the trained depth estimation network, estimating a distance from the fisheye camera to an object present in the fisheye camera image; and
controlling the operation of a vehicle system based on the estimated distance from the fisheye camera to the object present in the fisheye camera image.

15. The non-transitory computer-readable medium of claim 13, the steps further comprising:
further training the pretrained or trained depth estimation network using a plurality of modally-different image frames while applying a modal consistency constraint, thereby providing a further trained depth estimation network.

16. The non-transitory computer-readable medium of claim 15, the steps further comprising:
receiving a fisheye camera image from the fisheye camera coupled to the vehicle and, using the further trained depth estimation network, estimating a distance from the fisheye camera to an object present in the fisheye camera image.

17. The non-transitory computer-readable medium of claim 13, wherein the pretraining and training utilize a fisheye camera projection model that projects a disparity map into a point cloud map, thereby aiding in a rectification of fisheye camera stereo pairs.

* * * * *